May 11, 1965   G. H. MESSERLY   3,182,451
THRUST CONTROL MEANS
Filed Jan. 15, 1962

IRREGULAR BURNING SURFACE

INVENTOR.
GEORGE H. MESSERLY
BY Cecil F. Arens
ATTORNEY

United States Patent Office 3,182,451
Patented May 11, 1965

3,182,451
THRUST CONTROL MEANS
George H. Messerly, South Bend, Ind., assignor to The Bendix Corporation, South Bend, Ind., a corporation of Delaware
Filed Jan. 15, 1962, Ser. No. 166,257
7 Claims. (Cl. 60—35.6)

This invention relates to a means for controlling thrust and more particularly to a means for controlling the rate of combustion of a propellant.

It is therefore an object of this invention to provide means to vary the transmission of heat of combustion throughout a propellant.

It is another object of this invention to provide means to increase the area of combustion surface of a propellant.

Other objects, uses and advantages of this invention will become obvious or be apparent from a consideration of the following detailed description and the accompanying drawings.

In solid propellant combustion chambers there are numerous advantageous features. However, a weakness in such chambers lies in the sensitivity of rocket thrust to propellant soak temperatures which is the environmental temperature of the propellant. Since the environmental or soak temperature is very high in the combustion chamber, rapid deterioration of the propellant by combustion takes place. Therefore, it may be readily appreciated that any means for controlling the environmental or soak temperature is desirable, and this is an intended application of the present invention.

Figure 1:
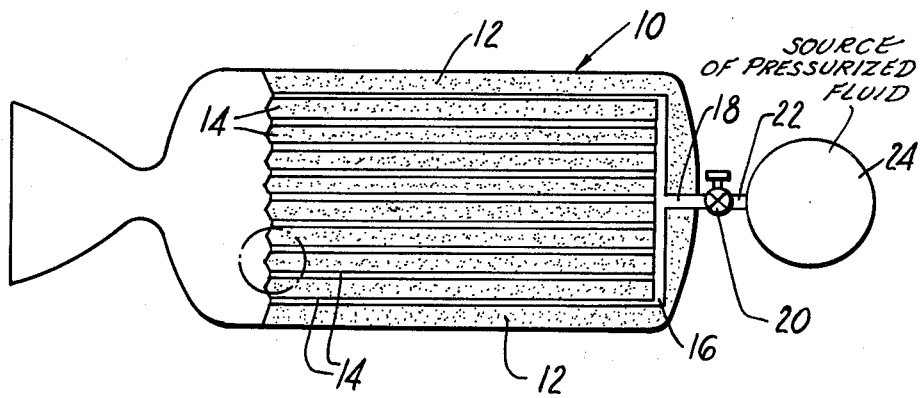
FIGURE 1 is a schematic presentation of one form of combustion chamber to which the present invention may be applied.

Referring now to the drawings and in particular to FIGURE 1, there is shown a rocket engine 10 having a solid propellant 12 enclosed therein. The propellant may take on the characteristics of any of the known substances as this invention is readily applicable to any propellant composition.

A plurality of metal tubes 14 of very thin wall or capillary type construction are provided and increased by the propellant 12 to be interspersed therethrough. In addition, the tubes 14 can be of high heat conductive metal construction, such as, for example, silver or of a lower heat conductive metal construction. The tubes 14 are joined by a manifold 16 which has a conduit 18 connected therewith and extending to a point exterior of said rocket engine.

Figure 3:
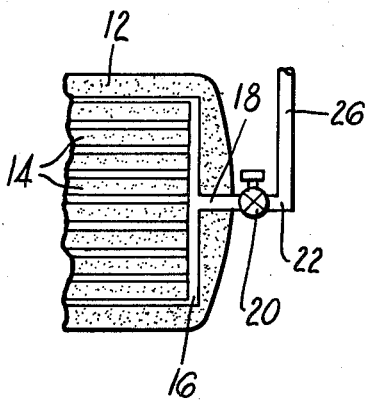
FIGURE 3 is a broken sectional view of the combustion chamber of FIGURE 1 having a modified heat flow control system.

A valve 20 is also shown in FIGURE 1 to be connected in flow controlling relationship with the conduit 18, and another conduit 22 leads from the valve 20 to a fluid or gas storage tank 24. In FIGURE 3, conduit 22 leads to an overboard vent 26 which exhausts to the relatively low pressure fluid medium, as for example, the atmosphere, through which the rocket motor travels.

The storage tank 24 contains a low temperature fluid or gas and is suggested for use with an engine having a propellant containing tubes 14 having a high rate of heat conductivity such as the silver tubes mentioned above. With such a system there is need to slow down the rate of heat conductivity and thus compensate for soak temperature effects. This is accomplished by the contents of tank 24 being allowed to enter the capillary tubes 14 by opening valve 20. In operation the contents of tank 24 are forced therefrom through valve 20 to enter the capillary tubes 14 where they flow in the direction of arrows 28 and tend to retard the heat flow shown by arrows 30 flowing through propellant 12. This reduces the so-called soak temperature of the propellant behind the burning surface to retard the burning of the propellant.

By making the tubes 14 of a lower heat conductive metal they would function as does the contents of the tank 24 aforementioned would i.e. to retard burning of the propellant. With such a tube construction the conduit 22 may lead to the overboard vent 26 (as shown in FIGURE 3). With this system the valve 20 is utilized to control the conduction of exhaust gases through the capillary tubes 14, the manifold 16 and the conduit 18 to the overboard vent 26.

It may be thus readily appreciated that the hot exhaust gases as they flow through the capillary tubes 14 of low heat conductivity speed up the heat flow in the direction of arrows 30 to increase the rate of propellant combustion by progressively increasing the environmental or soak temperatures of the propellant.

Figure 2:
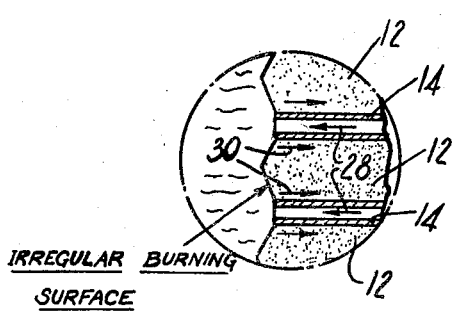
FIGURE 2 is a detailed view of the circled section of the combustion zone of the combustion chamber of FIGURE 1 showing the heat flow in a propellant and tube arrangement constructed according to the present invention.

In addition, and with particular reference to FIGURE 2, it is seen that regardless of their heat conductivity the tubes 14 will cause higher propellant temperatures about the tube walls. This leads to the increased burning of propellant about tubes 14 which in turn causes an irregular rather than a straight burning surface. As is obvious, this irregular surface then presents a greater combustion surface than would a straight surface.

As above indicated, the contents of tank 24 may be a modulating fluid such as a gas, e.g. helium, or a liquid, e.g. water or ammonia. As for apparatus necessary to circulate such contents and even as to the circulation of the exhaust gases, anyone skilled in the art could incorporate such pumps and/or reservoirs as are readily available in the prior art in the above system.

While certain embodiments of the invention have been described for illustrative purposes, the invention obviously is not limited thereto.

I claim:
1. In a solid propellant rocket motor, a means for controlling the combustion of the solid propellant comprising,
   a rocket motor case,
   a solid propellant contained by said case,
   a plurality of spaced apart relatively high heat conductivity, capillary type tubes interspersed in said propellant in heat transfer relationship therewith and openly communicating at one end with the surface of combustion of said propellant,
   a source of fluid,
   a conduit connecting said source of fluid with the opposite ends of said plurality of tubes,
   valve means operatively connected to said conduit for controlling fluid flow therethrough,
   said plurality of tubes being operative to transfer heat between said propellant surrounding the tubes and the fluid flowing through the tubes to control the temperature of said propellant and thus the rate of combustion thereof.

2. In a solid propellant rocket motor, a means for controlling the combustion of the solid propellant as claimed in claim 1 wherein said source of fluid is at a temperature relatively low compared to the temperature of said propellant and at a pressure higher than the pressure of the products of combustion of said propellant,
   said valve means being operative to control the flow of fluid from said source to said plurality of tubes,
   said plurality of tubes being operative to conduct heat from said propellant surrounding the same to the fluid flowing through said tubes to control the temperature of said propellant and reduce the rate of combustion thereof accordingly.

3. In a solid propellant rocket motor, a means for controlling the combustion of the solid propellant comprising,
   a rocket motor case,
   a solid propellant contained by said case,
   a plurality of spaced apart tubes interspersed in said propellant in heat transfer relationship therewith and openly communicating at one end thereof with the surface of combustion of said propellant to provide unrestricted communication therewith,
   a source of fluid,
   a conduit connecting said source with the opposite ends of said plurality of tubes,
   valve means operatively connected to said conduit for controlling fluid flow therethrough,
   said plurality of tubes being operative to transfer heat between said propellant surrounding the tubes and the fluid flowing through the tubes to control the temperature of said propellant and thus the rate of combustion thereof.

4. In a solid propellant rocket motor, a means for controlling the combustion of the solid propellant as claimed in claim 1 wherein said plurality of tubes are formed of a metal such as silver.

5. In a solid propellant rocket motor, a means for controlling the combustion of the solid propellant as claimed in claim 1 wherein said source of fluid is a tank of pressurized gas such as helium.

6. In a solid propellant rocket motor, a means for controlling the combustion of the solid propellant as claimed in claim 1 wherein said source of fluid is a pressurized liquid such as water.

7. In a solid propellant rocket motor, a means for controlling the combustion of the solid propellant comprising:
   a rocket motor case;
   a plurality of spaced apart tubes interspersed in said propellant in heat transfer relationship therewith and openly communicating at one end thereof with the surface of combustion of said propellant to provide unrestricted communication therewith;
   a conduit connecting the opposite ends of said plurality of tubes with an overboard vent which exhausts to the fluid surrounding said rocket case;
   valve means operatively connected to said conduit for controlling the flow of combustion gases therethrough to said vent;
   said plurality of tubes being operative to transfer heat to said propellant from said combustion gases flowing through said tubes to control the temperature of said propellant and thus the rate of combustion thereof.

References Cited by the Examiner
UNITED STATES PATENTS

| | | | |
|---|---|---|---|
| 2,689,452 | 9/54 | Jordan | 60—39.3 |
| 2,753,801 | 7/56 | Cumming | 60—35.6 |
| 2,874,537 | 2/59 | Scarborough et al. | 60—39.3 |
| 3,019,687 | 2/62 | Gongwer | 60—35.6 |
| 3,021,748 | 2/62 | Miller | 60—35.6 |
| 3,031,842 | 5/62 | Ledwith | 60—35.6 |
| 3,105,350 | 10/63 | Eichenberger | 60—35.6 |

SAMUEL LEVINE, *Primary Examiner.*

ABRAM BLUM, *Examiner.*